UNITED STATES PATENT OFFICE.

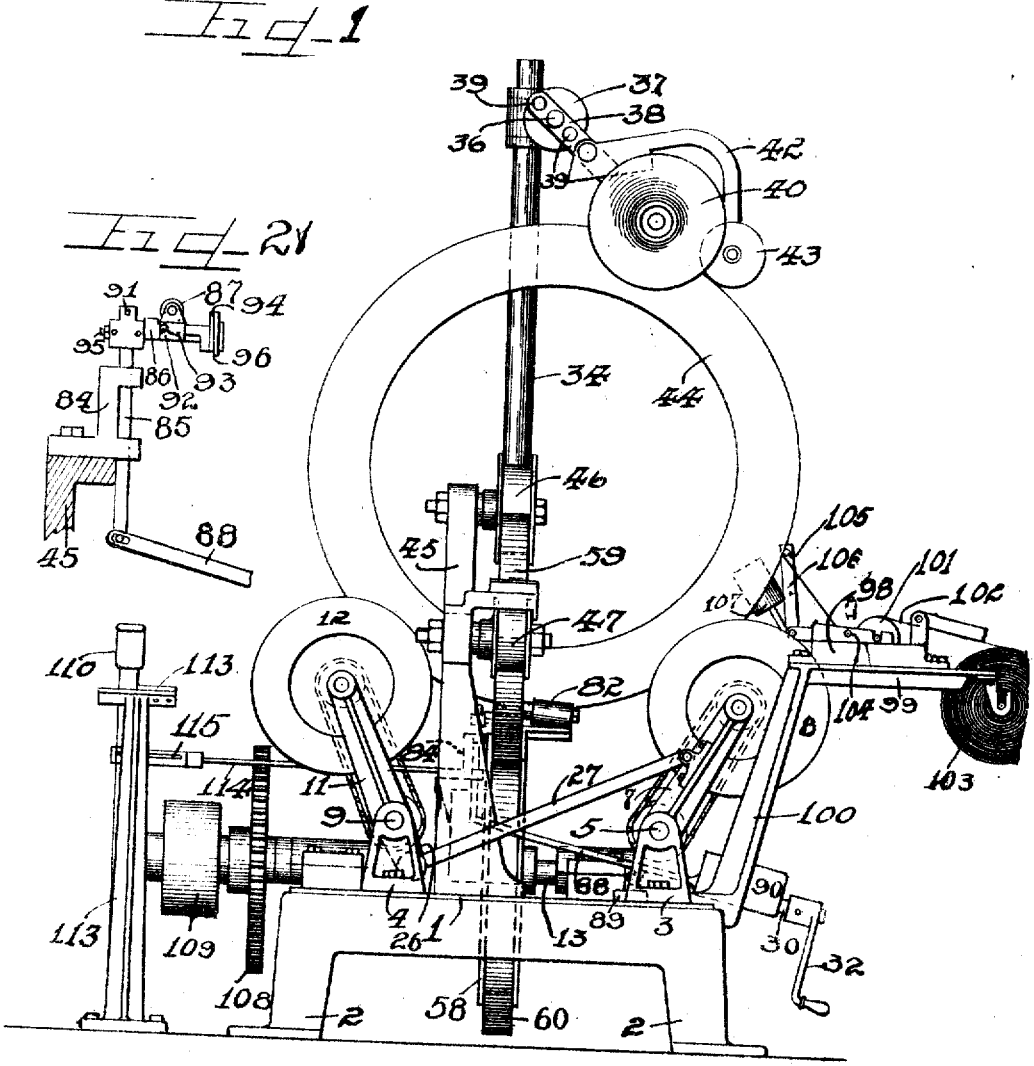

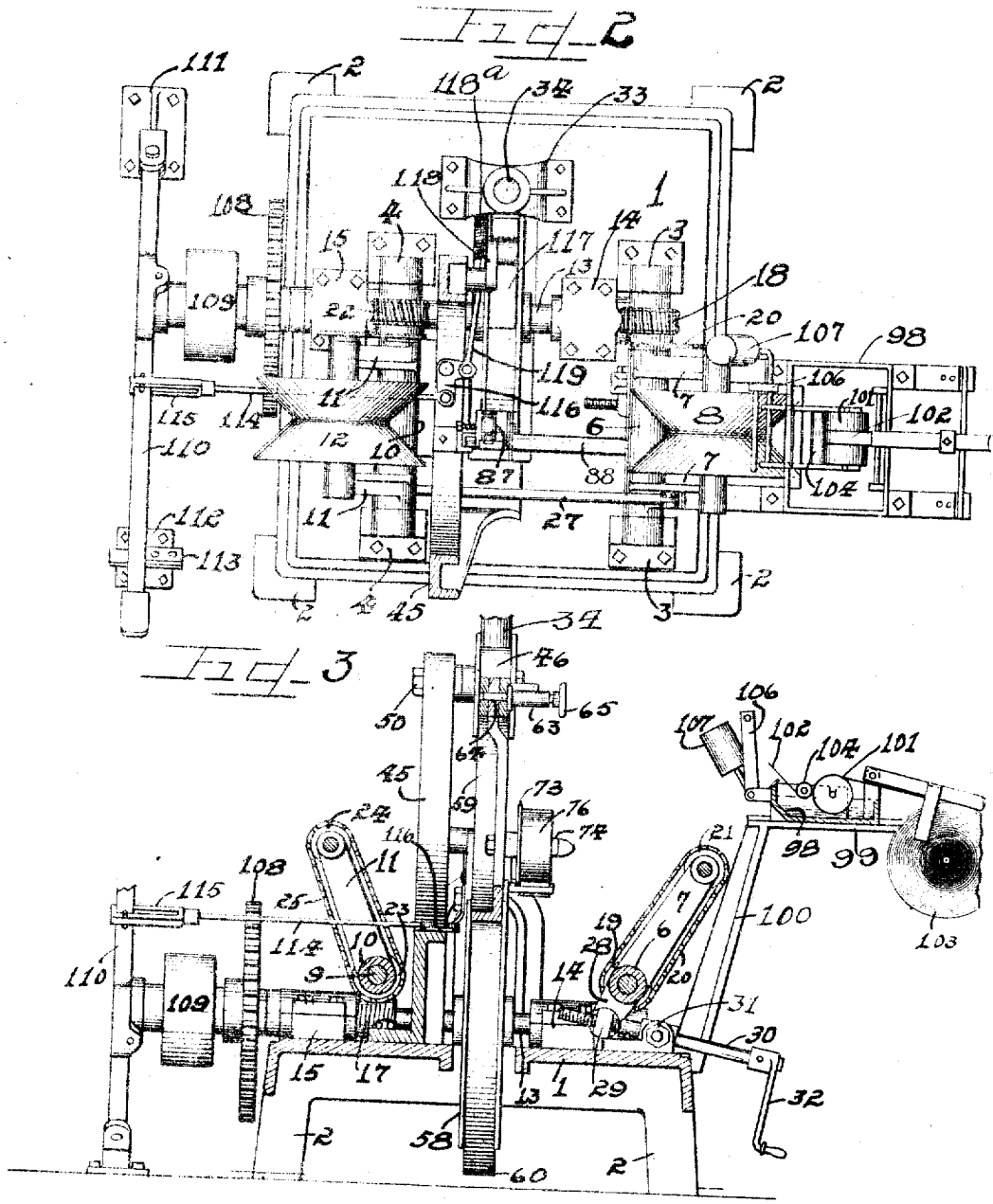

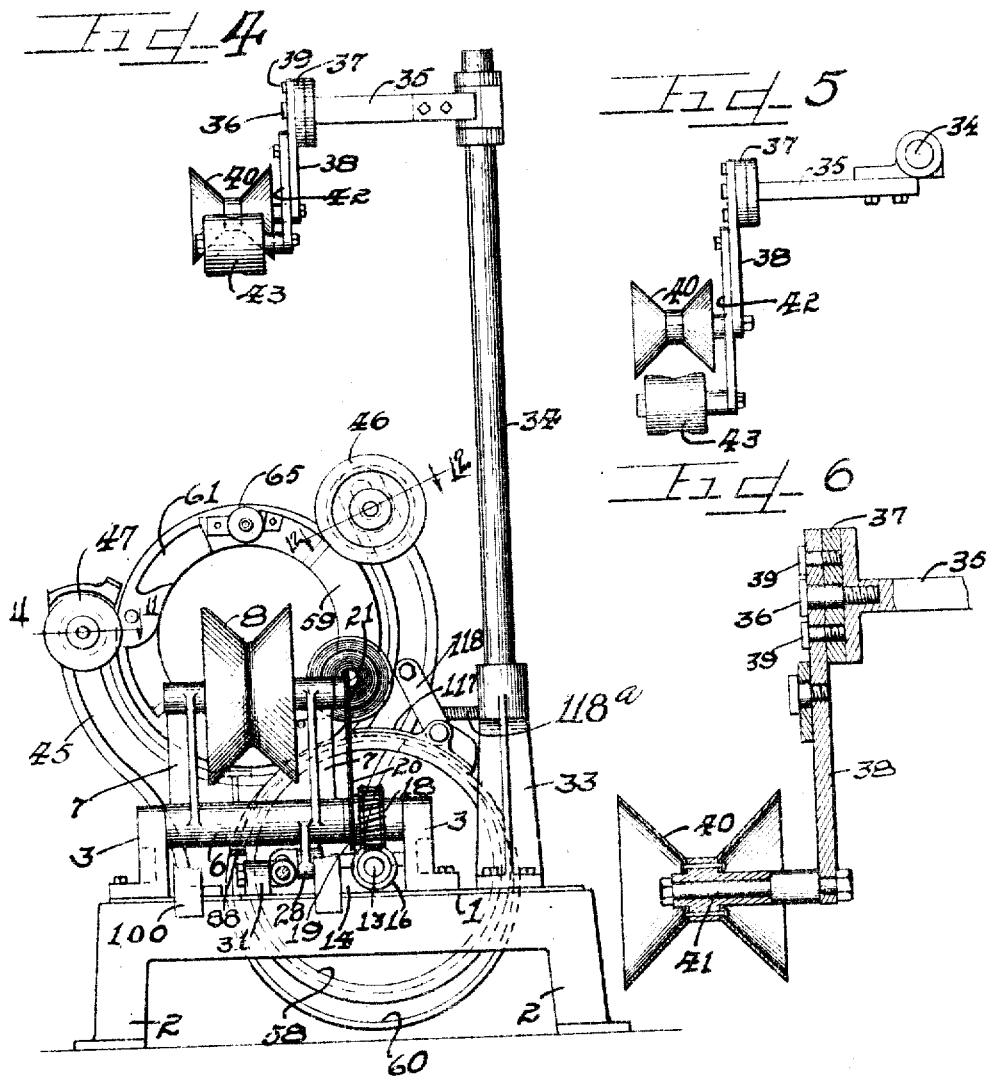

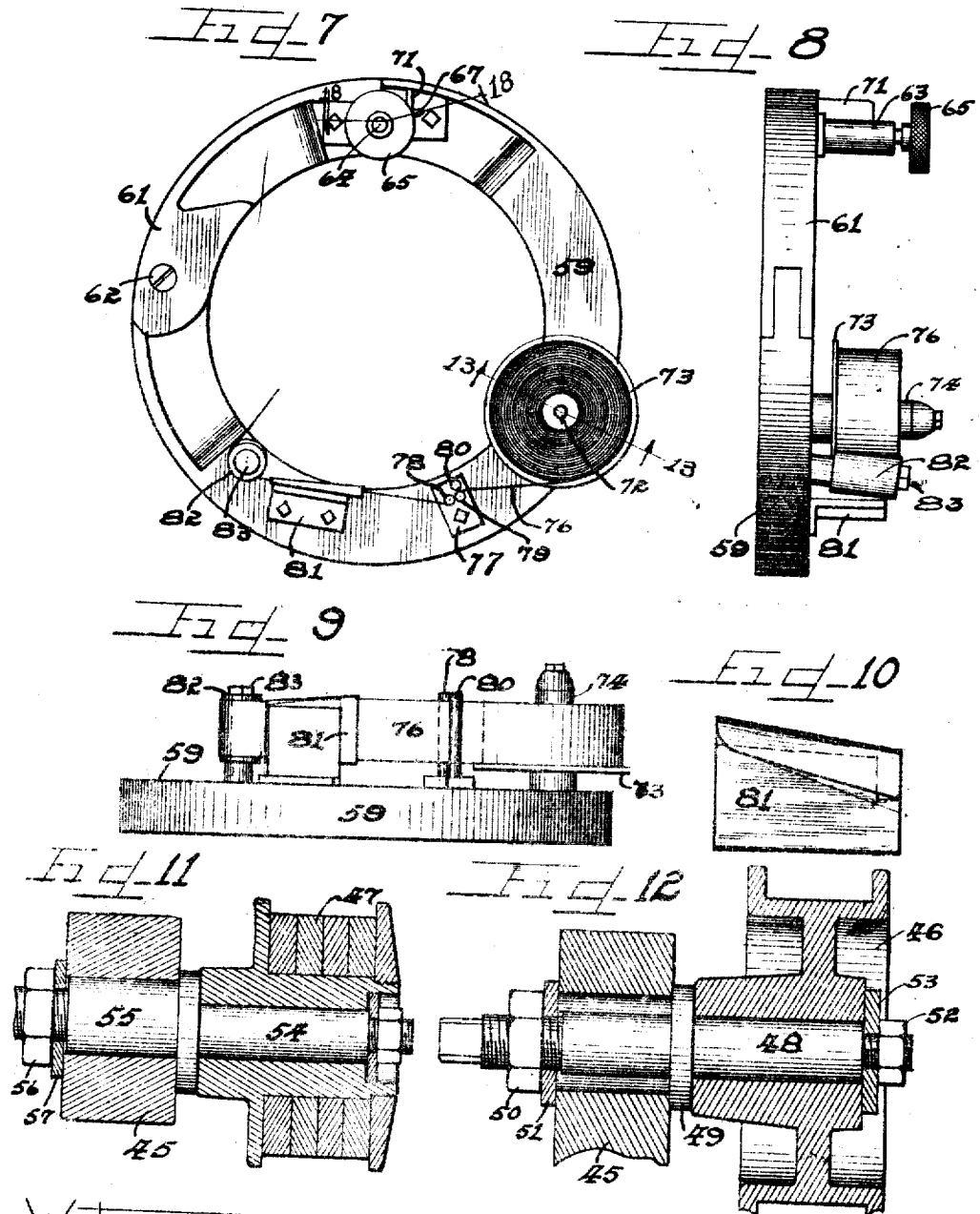

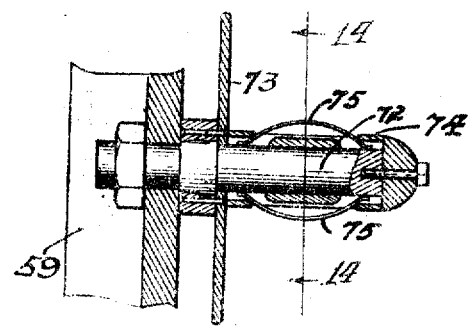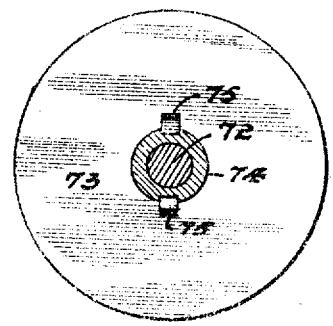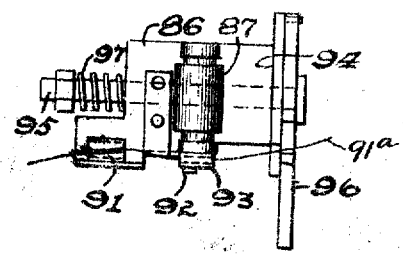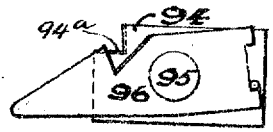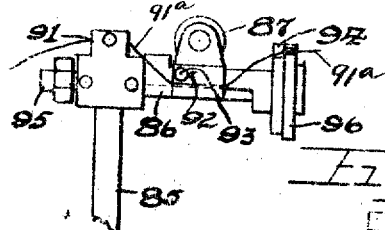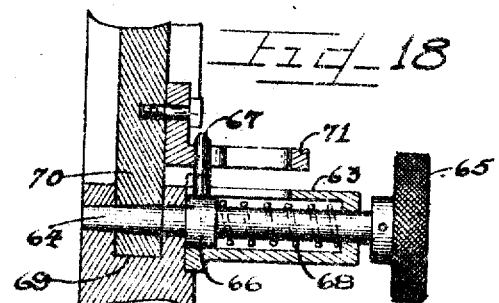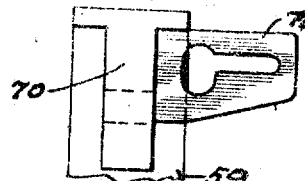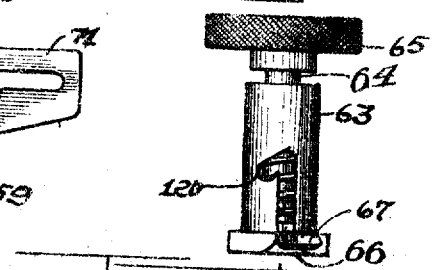

FRANK M. PIERCE, OF CHICAGO, ILLINOIS, ASSIGNOR TO PIERCE WRAPPING MACHINE COMPANY, OF CHICAGO, ILLINOIS, A CORPORATION OF ILLINOIS.

TIRE-WRAPPING MACHINE.

1,263,923.     Specification of Letters Patent.     Patented Apr. 23, 1918.

Application filed October 3, 1914. Serial No. 864,735.

*To all whom it may concern:*

Be it known that I, FRANK M. PIERCE, a citizen of the United States, and a resident of the city of Chicago, in the county of Cook and State of Illinois, have invented certain new and useful Improvements in Tire-Wrapping Machines; and I do hereby declare that the following is a full, clear, and exact description of the same, reference being had to the accompanying drawings, and to the numerals of reference marked thereon, which form a part of this specification.

In the widespread production of tires for use on automobiles and other vehicles, proper wrapping of the tire for shipment has become an important item. This invention relates to a machine for rapidly applying a spiral wrapper to a tire, gluing the same thereon and introducing a cord into the wrapping, by which the wrapper may be easily detached from the tire when so desired.

It is an object of this invention to construct a machine adapted to receive a tire supported therein in vertical position engaged through the eye of a shuttle which carries wrapping material, so that when the machine is driven the tire is caused to rotate through the eye of the shuttle and likewise the shuttle rotates through and around the tire, and a helical wrapper is thus applied upon the tire.

It is also an object of this invention to construct a machine wherein the driving and supporting means for the tire are adjustably mounted to position tires of different size properly with respect to the shuttle, that is, slightly eccentric with respect thereto to give the rotating tire a lead, resulting in the application of the paper strip thereto without twisting of the paper.

It is also an important object of this invention to construct a machine adapted to receive tires of different size therein, and to rotate the same synchronously with a shuttle engaged through the eye of the tire and carrying a reel of wrapping material, which is led through a suitable folding device and around an angled idler roller to insure flat application of the wrapping material upon and around the tire which is slightly offset or eccentric for the purpose with respect to the shuttle.

It is also an important object of this invention to construct a machine adapted to apply a spiral wrapping to annular objects, the supporting and driving means for the object being adjustable to properly position articles of different size in the machine, the degree of adjustment of the various supporting means being a different quantity, however, to insure an offset position of the tire with respect to the shuttle.

It is furthermore an important object of this invention to construct a wrapping machine which operates to apply a spiral folded strip of wrapping material upon an annular object, sealing the same thereon with a secondary peripheral strip of wrapping material and inclosing within the wrappings a cord disposed around the object which may be used to rip the wrappings therefrom when so desired.

It is finally an object of this invention to construct an improved wrapping machine operating efficiently and at high speed to apply a wrapper to annular objects.

The invention (in a preferred form) is illustrated in the drawings and hereinafter more fully described.

In the drawings:

Figure 1 is a front elevation of a machine embodying the principles of my invention.

Fig. 2 is a top plan view thereof.

Fig. 3 is a vertical section taken through the machine showing parts in elevation and parts omitted.

Fig. 4 is an end view of the wrapping machine.

Fig. 5 is a detail top plan view of the supporting and guiding means for an article at the upper end of the machine.

Fig. 6 is a detail sectional view of said guiding means.

Fig. 7 is a front view of the shuttle detached from the machine.

Fig. 8 is an end view thereof.

Fig. 9 is a top plan view of the shuttle shown in Fig. 7.

Fig. 10 is a detail view of the folder plate on the shuttle.

Fig. 11 is a detail section taken on line 11—11 of Fig. 4.

Fig. 12 is a detail section taken on line 12—12 of Fig. 4.

Fig. 13 is a detail section taken on line 13—13 of Fig. 7, with the paper omitted.

Fig. 14 is a section taken on line 14—14 of Fig. 13.

Fig. 15 is a top plan view of the mechanism through which the string or cord is drawn to be wrapped with the tire.

Fig. 16 is a side view thereof.

Fig. 17 is a face view of the cutting mechanism associated with said cord feeding mechanism.

Fig. 18 is a section taken on line 18—18 of Fig. 7.

Fig. 19 is a fragmentary detail top plan view of the locking bolt shown in Fig. 18.

Fig. 20 is a detail top plan view of a guide slot on the shuttle coacting with said locking bolt.

Fig. 21 is a detail view of the gravity or counter-weighted feeding mechanism for the cord.

As shown in the drawings:

The mechanisms of the machine are mounted upon a flat table 1, supported at its corners by means of integral legs 2. For this purpose a pair of bearing brackets 3, are secured on said table 1, at one side thereof, and another pair of similar bearing brackets 4, are mounted near the other side thereof. Journaled in the bearing brackets 3, is a shaft 5, and a long tubular member 6, having outwardly directed bracket arms 7, is pivotally engaged upon said shaft. Journaled in the upper end of said arms 7, is a grooved roller 8, which, with said pivoted arms as a support, is thus swingingly mounted upon said shaft 5. Similarly in the other bearing brackets 4, a shaft 9, is journaled, which has engaged thereover a tubular member 10, having integral arms 11, outstanding therefrom, and at their upper ends swingingly supporting journaled therein a grooved roller 12.

A main drive shaft 13, is journaled across said table 1, in bearings 14 and 15, provided for the purpose, and has keyed thereon worms 16 and 17, respectively. A small worm gear 18, is journaled upon the shaft 5, and meshes with the worm 16, and rigidly connected to said worm gear is a small sprocket wheel 19, which has trained thereabout a sprocket chain 20, which is in turn trained about a sprocket wheel 21, connected to the shaft of the grooved roller 8. Similarly the grooved roller 12, is driven from the main shaft 13, by a worm gear 22, meshing with the worm 17, and having rigidly associated therewith a small sprocket wheel 23, which has trained thereabout and about a sprocket wheel 24, secured to the shaft of said pulley 12, a driving chain 25. Said bracket arms 7 and 11, which support the respective grooved rollers 8 and 12, are connected for simultaneous adjustment toward and away from one another, and yet in a manner to insure greater displacement of the roller 12, for a given movement of the roller 8.

For this purpose a short downwardly directed rock arm 26, is formed on the under side of said tubular member 10, and is connected by means of a link 27, to one of the arms 7, of the swinging support for the roller 8. For the purpose of adjusting said rollers 8 and 12, toward or away from one another, as the case may be, a short rock arm 28, is formed integral with the tubular member 6, on the under side thereof, and at its end has pivoted thereto an internally threaded sleeve or nut 29, which engages a lead screw 30, journaled in a pivot 31, on said table top, and actuated by a hand crank 32. Mounted in a bracket 33, at the rear of said table 1, is an upright standard 34, which, at its upper end has secured adjustably thereon a bracket 35. A bolt 36, is threaded into the face of the flanged extension of said bracket 35, and journaled thereon is a disk 37. A bracket arm 38, is secured to said disk 37, by means of stud screws 39, thus permitting a pivotal movement of said arm 38, to take place. A small grooved roller 40, is journaled upon a stud bolt 41, secured through the lower end of said arm 38, the length of the bracket 35, being such that said roller 40, is vertically alined with said grooved rollers 8 and 12.

Another arm 42, is pivoted upon the arm 38, and at its lower end has journaled thereon a concave roller 43, which is adapted to track upon the outer periphery of a tire 44, placed in the machine for wrapping. A relatively large heavy crescent shaped bracket 45, is bolted to said table top 1, and at its upper extremities has journaled thereon large and small grooved rollers 46 and 47, respectively. For this purpose the longer arm or extension of said crescent bracket 45, is slotted, and engaged therethrough is a stud bolt 48, provided with an integral flange 49, which coacts with a nut 48 and washer 50, to clamp said bolt at any desired position in the slot. Said roller 46, is held journaled on the stud bolt 48, by means of a nut 52, and a washer 53. The other smaller grooved roller 47, is journaled upon a stud bolt 54, which is eccentric with respect to an enlarged shank portion 55, engaged through an aperture in said crescent frame and retained rigidly, though adjustably, therein by means of a nut 56 and washer 57.

A relatively large grooved wheel 58, is secured upon the main drive shaft 13, in the plane of rotation of said respective grooved rollers 46 and 47, and supported upon said grooved wheel and rollers, which contact the same at three points, is a shuttle, denoted as a whole by the reference numeral 59. A length of belt 60, is looped about said large grooved wheel 58, as clearly shown in Fig. 4, and the shuttle 59, rests thereon and is driven by the moving belt on said rotating grooved wheel 58. Said shuttle 59, of course is provided with a flat periphery to permit the same to track in the grooves of said respective rollers 46 and 47, and upon the belt 60, in the groove of the large pulley wheel 58.

A hinged section 61, is connected into, and forms a part of said annular shuttle, by means of a stud screw 62, and has secured on its surface at one side, an outstanding slotted sleeve or cylindrical member 63, the details of which are clearly shown in Figs. 18 and 19. Axially movable within said small cylinder 63, is a locking bolt 64, which, on its outer end, is provided with a knurled head 65, and near its middle with a rigid collar 66, having an outstanding pin 67, projecting therefrom through the slot in the cylinder 63. A coiled spring 68, is disposed within said cylinder 63, and bears at one of its ends against said collar 66, on the locking bolt, and at its other end against the end wall of said cylinder, thus normally impelling said locking bolt 64, inwardly into locking position. The end of said hinged section 61, of the shuttle at which said locking bolt 64, is disposed, is provided with a groove 69, adapted to receive therein the tongue 70, forming a part of the main section of said shuttle, and said bolt 64, extends through an aperture in the tongue 70, when the same is inserted into the groove of the hinged section, thus holding the hinged section locked in a closed position.

A short bracket plate 71, is bolted on one side of the tongue 70, and is provided with a key shaped slot therein, through which the pin 67, of the locking bolt projects. Secured on the side face of said shuttle, is a bolt 72, which has journaled thereon a paper reel comprising a disk 73, and a hub portion 74, said hub portion being slotted longitudinally and having sprung therein leaf springs 75, on diametrical opposite sides, which act resiliently to retain a roll of paper upon the reel. Said leaf springs 75, bearing at their ends against the stud bolt 72, act as a brake for the reel of paper to prevent spinning or overtravel thereof when the machine is suddenly stopped. The paper, which is denoted by the reference numeral 76, is led from the reel through a suitable tension mechanism which comprises a bracket 77, secured upon the face of the shuttle having three small pins or rollers 78, 79, and 80, engaged thereon, and around which said strip of paper is caused to track. From the tension mechanism the paper is led to a folder plate 81, which as clearly shown in Fig. 10, consists merely of a flat plate, one margin of which is turned over and down at an angle, so that the edge of a piece of paper drawn therethrough is caused to be folded over in a like manner. The folded strip of paper is led around a roller 82, journaled on a bolt 83, secured at an angle in the side face of the shuttle, and from said roller, which creases the fold, the paper leads to the tire upon which it is applied.

As shown in dotted lines in Fig. 1, a small bracket 84, is bolted on an extension of the crescent bracket 45, and sliding vertically through slots in said bracket and down alongside of said crescent bracket extension, is a bar 85, which, at its upper end has secured thereon a small horizontal frame piece 86, in which is journaled a roller 87. The lower end of said slidable bar 85, is connected to one end of a long lever 88, which is pivoted in a bearing 89, upon the table 1, and at its other end is provided with a counterweight 90. Thus said roller 87, is counterweighted to bear yieldingly upwardly beneath the tire 44.

The string 91ª which is wrapped with the tire is led through an eye element 91, on said frame piece 86, then downwardly through a tension block 92, held in place by a pin 93, from which it leads upwardly to the tire, through an acute notch 94ª in an end plate 94, secured on the bracket piece 86. A bolt 95, extends slidably through said frame piece 86, and at its outer end pivotally maintains a notched cutting plate or knife 96, flat against said end plate 94, said knife being impelled against said plate by a spiral compression spring 97.

For the purpose of applying and gluing a peripheral strip of paper upon the tire after the spiral wrapping has been placed thereon, a small vessel 98, is bolted upon the horizontal extension 99, of an angled upright 100, which is bolted to the table 1, on one side thereof, and removably journaled in said vessel is a moistening roll 101. Said vessel 98, is filled with water, and a strip of paper 102, from a reel 103, supported in hooked extensions on the outer end of the horizontal extension 99, is drawn over said moistening roll with the adhesive side of said paper strip contacting the same. The strip is then drawn upwardly beneath a pin 104, and from there led beneath a pin or roller 105, on a pivoted bracket arm 106. A counterweight 107, is connected to said pivoted arm 106, and normally holds the same toward the rotating tire 44, as shown clearly in Fig. 1.

A drive is imparted to the main shaft 13, by means of a gear 108, journaled thereon and adapted to be connected thereto or disconnected therefrom, as the case may be, by means of a suitable clutch 109, which is operated by a lever 110, pivoted at one end upon a standard 111, and at its other end resting upon a standard 112, behind a stop 113. A brake is provided to stop the movement of the various mechanisms when the clutch 109, is disengaged, and for this purpose one end of a longitudinal actuating lever 114, is provided with an apertured yoke 115, adapted to be engaged to the lever 110, by means of a pin, and the other end of said lever is connected to a small bell crank 116, pivoted upon said crescent bracket 45. A brake shoe 117, is connected to and supported by a crank 118, pivoted upon the crescent bracket 45, said shoe positioned to bear downwardly upon the belt 60, on the large grooved wheel 58. A short link 119, is connected to said bell crank 116, and to the lever 118, and acts, when the lever 114, is moved by the clutch lever 110, to pull the brake shoe downwardly upon the belt 60, thus stopping the mechanisms from movement. A small spiral spring 118ª, is connected to the lever 118, and to the bracket 38, and acts to normally hold the brake retracted.

The operation is as follows:

The tire or other annular object to be wrapped is placed into the machine by opening the hinged section 61, of the shuttle, and placing the article upon the grooved rollers 8 and 12, the grooved roller 40, at the upper end of the device being swung upwardly out of normal position for the purpose. The shuttle is then closed, and after holding the end of the paper strip and the string upon the tire the clutch is engaged and the shuttle rapidly rotated, driven by contact with the belt 60, confined between the shuttle and the grooved driving wheel 58. The small roller 47, on the eccentric stud bolt can be adjusted to hold the shuttle in proper position against the other roller 46, and grooved driving wheel 58. It is to be noted particularly that the shuttle does not rotate through the eye of the annular article on a diameter thereof, but slightly forwardly the center, and the guide roll 82, on the shuttle, is inclined, so that the folded strip of paper drawn from the reel on the shuttle is applied flat upon and around the tire. Of course the grooved rollers 8 and 12, may be adjusted into various positions for articles of different size, and in view of the fact that the link 27, between said rollers, is connected at different radial distances from the point of support thereof, the degree of movement of said rollers when the crank 32, is rotated is different. Consequently in all adjustments the relation of the shuttle to the article to be wrapped is the same, that is, the shuttle is positioned slightly forwardly of the center of the article.

As the spiral wrapper is applied around the tire, the tire or article of course being driven by said grooved rollers 8 and 12, an adhesive strip 102, is applied on the periphery thereof, the same coming from the reel 103, around the moistening roll 101. The small concave roller 43, at the upper end of the device tracks upon said adhesive strip to insure sealing thereof upon the tire, and of course the grooved roller 40, acts to hold the tire properly positioned in the machine. A string is wound with the tire within the wrapping, so that the wrapping may be ripped from the tire when so desired, and for this purpose the end of the string, a ball of which may be disposed at any convenient point, is led through the respective eyes 91 and 93, on the movable counterweighted frame piece for the roller 87. After the tire has been completely wrapped, the operator moves the spring impelled notched knife member 96, upwardly, thus cutting the string. All during the wrapping operation the tire is maintained in a vertical position with the shuttle also vertical and at right angles thereto rotating through the eye of the tire, but of course the shuttle rotates at a much higher speed than the tire. The plate 81, on the shuttle, serves to turn the edge of the wrapping strip inwardly, so that the exposed edge of the superposed layers of wrapping material on the tire is doubled, and there is slight possibility of the same being accidentally torn from the tire. The locking means for the shuttle, whereby the same is opened and closed, is exceedingly simple, the operator merely seizing the knurled head 65, and twisting the same and the pin 67, therewith in the slotted bracket piece 71. The pin 67, of course swings through the enlarged end of the key shaped slot in said bracket piece 71, and then the knurled head 65, is pulled outwardly against the compression of the spring 65, in the cylinder 63, the pin moving outwardly in the elongated portion of said slot in the plate 71. After the locking bolt 64, has been retracted from the tongue 69, which interfits the hinged portion of the shuttle, the knurled head is given a further twist, which serves to break the joint between the hinged shuttle sections, due to pressure upon the slotted plate 71, by the end of the pin 67. The final twist described given to the knurled head serves to also position the pin 67, in the hook shaped slot 120, thus retaining the locking bolt 64, retracted, and the shuttle section 61, may then be swung back into an entirely open position by hand. To close the shuttle it is only necessary to swing the hinged section inwardly and when the pin 67, strikes into the slot in the plate 71, it is kicked out of the hook shaped recess, thus releasing the bolt 64, which springs into locking position. The leaf springs 75, associated with the reel on which the paper 76, is placed, serve effectually to hold the reel of paper in position as the shuttle rotates, and yet without requiring any locking mechanism for the purpose.

I am aware that various details of construction may be varied through a wide range without departing from the principles of this invention, and I therefore do not purpose limiting the patent granted otherwise than necessitated by the prior art.

I claim as my invention:

1. In a wrapping machine of the class described, connected mechanisms simultaneously and differentially adjustable for holding and rotating an annular article, and a paper carrying shuttle adapted to rotate through the eye of the article to apply a spiral wrapping thereon, said shuttle positioned forwardly of the center of the tire.

2. In a wrapping machine of the class described a frame, pivotally mounted grooved supporting and driving rollers to receive an annular article therein, operative connections between said rollers whereby the same may be swung simultaneously into various positions of adjustment, said connections arranged to effect a different degree of movement of each of said rollers, and a power driven paper carrying shuttle rotatable through the eye of an article in the machine to apply a spiral paper wrapping thereon, said shuttle arranged with respect to said grooved rollers, so that the shuttle is positioned in advance of the center of the rotating article.

3. In a wrapping machine of the class described for annular articles, means supporting and rotating the article, mechanism for applying a spiral wrapping thereon, said mechanism comprising a power driven sectional shuttle positioned to rotate through the eye of the article in advance of the center thereof, and said means simultaneously and differentially adjustable to maintain the advance relation between the shuttle and article in all adjustments of said means.

4. In a device of the class described means supporting and rotating an annular object, a shuttle adapted to rotate through the eye thereof to apply a paper wrapping thereon, a movable counterweighted mechanism adapted to bear against the annular object to feed a string thereto beneath the wrapping to be wrapped therewith and means associated with said mechanism for severing the string after the wrapping operation.

5. In a machine of the class described mechanism supporting and rotating an annular object, means revolving a paper carrying shuttle therethrough to apply a wrapper thereon, counterweighted movable means bearing against the object acting to direct a string to be wrapped thereagainst beneath the wrapping adjustable guiding mechanism for the article, a cutter for severing the string, and means for automatically returning said cutter to normal.

6. In a device of the class described a frame, swingingly mounted grooved rollers thereon to support an article to be wrapped, a counterweighted string guiding mechanism disposed therebetween and bearing against the article acting to direct a string against the article to be wrapped therewith, mechanism revolving the shuttle through the eye of the article slightly in advance of the center thereof and closely adjacent said string guiding mechanism to apply a wrapper thereon, and operative connections between said grooved rollers to effect a differential movement thereof when the same are adjusted.

7. In a wrapping machine mechanism for supporting and advancing the article to be wrapped, mechanism for supplying a tearing member to the article, mechanism for wrapping the article and wrapping the tearing member in place, mechanism for supplying an adhesive strip to the article to bind the wrapping material in place, and means for firmly pressing the adhesive strip in place.

8. In a wrapping machine of the class described grooved swingingly mounted rollers adapted to support and rotate an article to be wrapped, mechanism adjusting said rollers differentially, a shuttle arranged to rotate through the eye of the article and carrying paper to apply the same to the article, means applying a peripheral adhesive wrapping on the article, and mechanism introducing a string along the article to be wrapped therewith.

9. In a wrapping machine for annular articles, means supporting and rotating the same, mechanism rotating through the eye of the article to apply a spiral wrapping thereon, means applying an adhesive peripheral secondary wrapping upon the article, and mechanism introducing a string along the article to be wrapped therewith.

10. In a wrapping machine of the class described mechanism applying a spiral wrapping to an article, means introducing a string with the article into the machine to be inclosed with the article within said spiral wrapping, and means sealing the spiral wrapping after its application upon the article as the same is rotated.

11. In a device of the class described a frame, swingingly mounted supporting means for an article to be wrapped, a paper carrying shuttle, driving means therefor and for said supporting means, a brake, a clutch connected to said driving means and connected with said brake whereby the latter is applied when the clutch is disconnected, means applying a secondary peripheral adhesive wrapping upon the article, and mechanism introducing a string with the article to be wrapped.

12. In a device of the class described a frame, swingingly mounted differentially adjustable grooved rollers to support the annular article to be wrapped, means for giving differential simultaneous adjustment to said rollers, a shuttle arranged to rotate through the eye of the article to apply a spiral wrapping thereon, a grooved wheel beneath said shuttle, a belt loosely trained around said wheel adapted to drive said shuttle by contact therewith and with said wheel, idler rollers holding the shuttle in position, and a drive for said differentially adjustable grooved rollers and grooved driving wheel.

13. In a wrapping machine of the class described rotatable adjustable supports for the article to be wrapped to revolve the same in a vertical position, a shuttle rotatable through the eye of the article carrying paper to be applied thereon, a grooved wheel upon which said shuttle tracks, a belt loose upon said wheel affording frictional contact between the shuttle and the wheel, idler rollers to guide said shuttle, a clutch controlled drive for said machine, and a brake adapted to be applied on said belt when the drive is disconnected from the machine.

14. In a tire wrapping machine of the class described connected swingingly mounted means differentially and simultaneously adjustable adapted to rotate with and support a tire, and a swingingly mounted roller disposed thereabove adapted to engage the upper periphery of the tire to maintain the same properly positioned upon said means.

15. In a tire wrapping machine of the class described operatively connected differentially adjustable supporting means for the tire, a shuttle disposed to rotate through the eye of said tire, said means in all adjustments positioning said tire to permit rotation therethrough of said shuttle in advance of the center of the tire, and swingingly mounted gravity action guiding mechanisms engaging the upper periphery of the tire to maintain the same properly positioned upon said differentially adjustable means.

16. A wrapping machine comprising a plurality of simultaneously and differentially adjustable supporting members, an alining member automatically adjustable to and from the supporting members by the insertion of the article to be wrapped, and mechanism for wrapping the article.

17. In a wrapping machine, supporting and advancing rollers, a loosely mounted swinging alining roller, means for winding a wrapping on the article to be wrapped, means for applying an adhesive strip to the wrapping, and a roller pivotally connected to the alining roller and movable therewith and independently thereof for pressing the adhesive strip on the wrapping material.

In testimony whereof I have hereunto subscribed my name in the presence of two subscribing witnesses.

FRANK M. PIERCE.

Witnesses:
CHARLES W. HILLS, Jr.,
FRANK K. HUDSON.